Feb. 28, 1933.  F. F. FORSHEE  1,899,681
VERTICAL TOASTER
Filed Sept. 15, 1931   2 Sheets-Sheet 1

WITNESSES:  INVENTOR
R. S. Williams  Frank F. Forshee.
H. M. Biebel  BY R. E. Marine
  ATTORNEY Feb. 28, 1933. F. F. FORSHEE 1,899,681
VERTICAL TOASTER
Filed Sept. 15, 1931 2 Sheets-Sheet 2
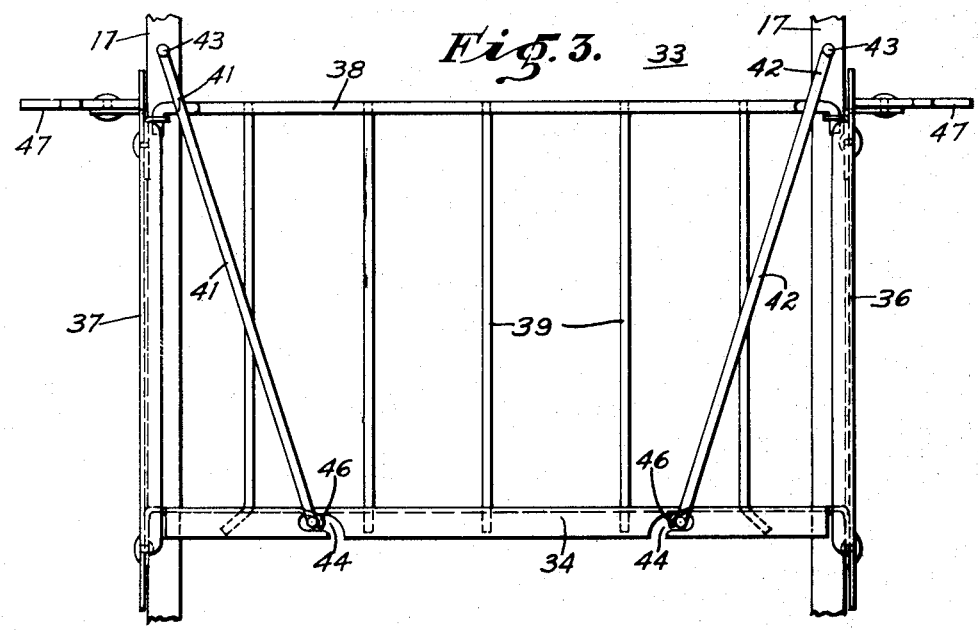
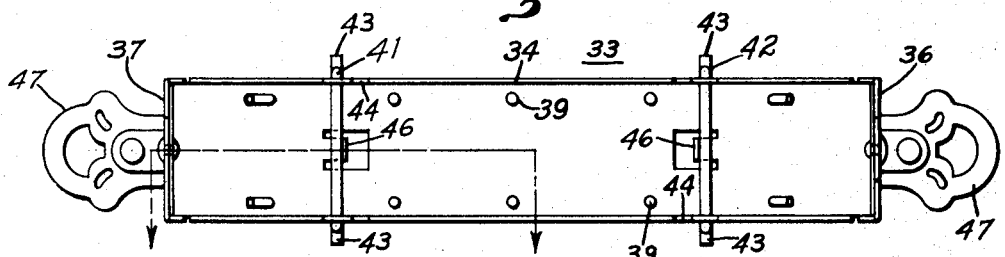
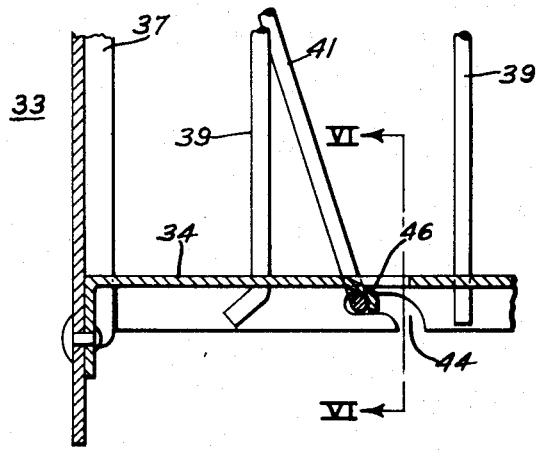
WITNESSES:
R. S. Williams
N. M. Biebel
INVENTOR
Frank F. Forshee.
BY
R. E. Marine
ATTORNEY Patented Feb. 28, 1933

1,899,681

UNITED STATES PATENT OFFICE

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA

VERTICAL TOASTER

Application filed September 15, 1931. Serial No. 562,871.

My invention relates to toasters and particularly to electric bread toasters having novel bread-supporting means.

Devices of this character disclosed in the prior art, and especially those having spaced opposed heating elements and made for domestic use have disadvantages in the operation of removing bread from between the heating elements. In general, the removal of a toasted slice of bread from toasters of present types requires considerable space on a table when the toast is removed in a direction laterally of the toaster.

It is, accordingly, an object of my invention to provide a practical and efficient means for removing the bread from between the heating elements of a toaster, which means shall be simple in construction and, therefore, economical to manufacture and easy to operate.

Another object is to provide a bread holder which shall be adapted to swing back automatically from a displaced position, where the toasted slice of bread may be removed, to a central position between opposed heating elements located in the toaster.

Another object of my invention is to provide a bread toaster which shall require a minimum amount of space when in use.

Figure 1:
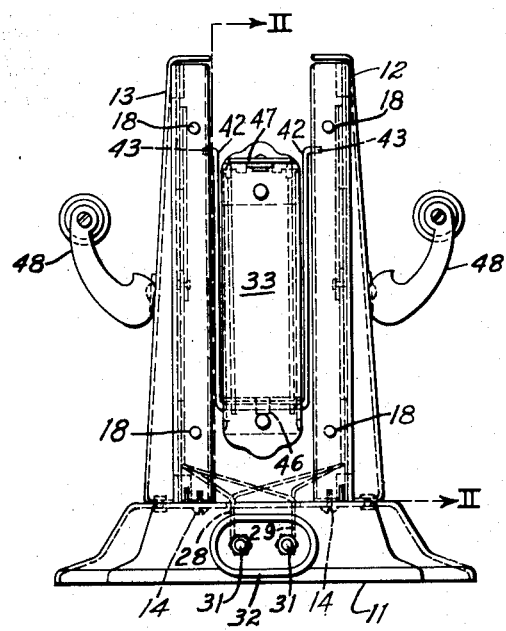
Figure 2:
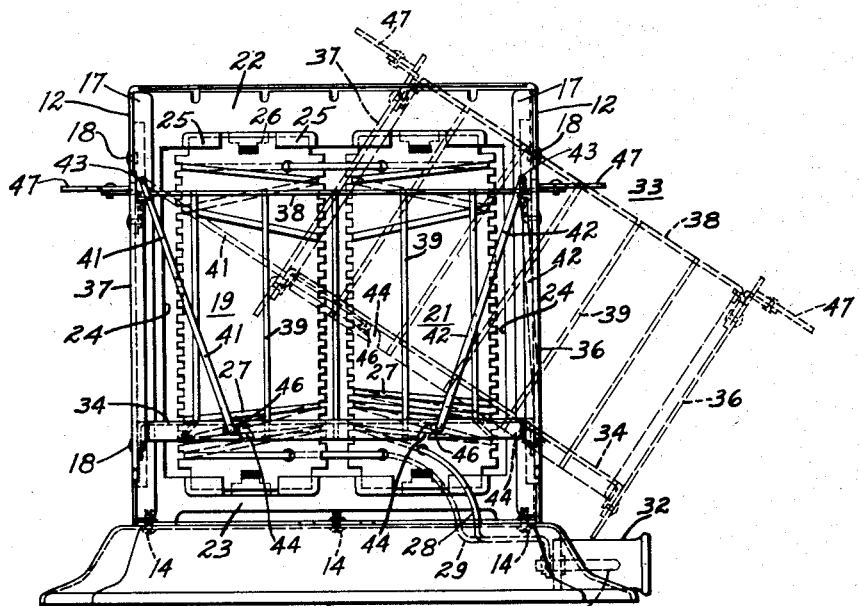

Other objects of my invention will become apparent from the following description, taken in conjunction with the accompanying drawings, in which:

Figure 1 is a view, in end elevation, of an electric bread toaster embodying my invention, Fig. 2 is a sectional view therethrough, taken on the line II—II of Fig. 1, showing the bread holder in both its normal and tilted positions, Fig. 3 is a view, in side elevation, of a bread holder, Fig. 4 is a bottom view of the bread holder shown in Fig. 3, Fig. 5 is an enlarged view, in longitudinal section, through a bread holder taken on the line V—V of Fig. 4, and Fig. 6 is a view, in lateral section taken on the line VI—VI of Fig. 5.

My novel bread toaster includes a base 11 which may be made of sheet metal and is preferably of substantially rectangular contour. A pair of vertical opposing spaced housings 12 and 13 of substantially flat dish-shape are secured to the base, as by screws 14.

I provide heating-unit supporting members 17, of substantially channel-shape which may be secured to the housings by rivets 18. A heating unit includes two pieces of mica 19 and 21, the upper and lower end portions of which fit into, respectively, an upper sheet-metal cross piece 22 and a lower sheet-metal cross piece 23 which may be integral with vertically extending portions 24, the portions 22, 23 and 24 constituting a skeleton frame of substantially rectangular shape.

Short projections 25 and 26 may be bent laterally out of the plane of portion 22, and the mica sheet be held therebetween, it being noted that two projections 25 and an intermediate projection 26 are provided for each of the mica sheets 19 and 21. The lower cross member 23 has substantially the same construction. A suitable resistor member 27 is wound in recesses in the vertical edges of the mica sheets, and their terminal leads 28 and 29 are connected to terminal pins 31 supported by, and insulated from, the base 11 and protected by a small housing 32.

While I have illustrated and described a specific form of heater element and of its support, I do not desire to be limited thereto, and it is to be noted that, while I have described only one part of the two-part heating unit, a similar one-part unit is provided in the other housing.

A bread holder 33 of skeleton shape is pivotally suspended in the open space between the opposed housings 12 and 13. The bread holder includes a bottom portion 34 which may be a sheet-metal plate of inverted channel-shape. End plates 36 and 37 suitably secured, near their lower ends, to the ends of member 34, upper bars 38, one at each side of the bread holder, having their ends suitably secured to the upper ends of side members 36 and 37, respectively, and a plurality of spaced vertically extending rods 39, whereby a bread holder is provided of general skeleton form, the side members of which cover a minimum amount of area of a piece of bread being toasted, the bread holder being open at the top to permit of insertion and removal of a slice of bread.

Two pivotal suspension members 41 and 42 are provided, each being of substantially U-shape and having out-turned upper ends 43 which fit into openings in the members 17 hereinbefore described. The member 34 has slots 44 of substantially L-shape in its flange portions, the distance between these slots being less, in a horizontal direction, than the distance between the upper ends 43 of the suspension members 41 and 42, for a purpose to be hereinafter more clearly set forth.

In order to hold the intermediate portions of the members 41 and 42 in the slots 44, I provide tongues 46 which are preferably integral parts of the members 34 and are bent over against, or adjacent to, the intermediate portions of the respective members 41 and 42 to retain them in the slots 44.

Handles 47 of electric and heat-insulating material are provided at the upper ends of the bread holder 33 by means of which it may be moved. Handles 48 may be provided for the housings to be used in carrying the toaster.

It has hereinbefore been set forth that the horizontal distance between the upper pivotally mounted ends of the members 41 and 42 are located a greater distance apart than are the lower ends thereof, the two positions of the members being clearly seen in Fig. 2 of the drawings. Let it be assumed that a piece of bread has been placed in the bread holder and toasted, it being understood that, during the toasting operation, the swinging bread holder occupied the position shown by the full lines in Fig. 2 of the drawings.

When it is desired to remove the toasted slice of bread, pressure may be applied by an operator on, say, the right-hand member 47 to effect a swinging and tilting operation of the bread holder, and by reason of the fact that the lower ends of the members of U-shape are located closer together than are the upper ends, that end of the bread holder being actuated or pressed downwardly will not only swing longitudinally of the bread holder, but will also swing downwardly. The other end of the bread holder will not only move longitudinally but will also move vertically upwardly and a final position of the tilted bread holder will be that shown by the broken lines in Fig. 2 of the drawings. A corner of the slice of bread just toasted will, therefore, be available to be grasped by an operator to effect removal thereof from the bread holder, after which another slice of bread may be located in the bread holder and, upon release of the pressure, on the right-hand member 47, the bread holder will swing back into its normal toasting position.

The device embodying my invention thus provides a relatively simple, compact and easily operated toaster in which the position of the bread holder, when removing a toasted slice of bread and inserting a new slice of bread, requires but little additional space on the table.

While I have disclosed a preferred form of my invention for the purpose of illustration, it is to be understood that various modifications are contemplated within the scope of the claims which follow.

I claim as my invention:

1. In a toaster, in combination, a frame, opposed heating elements, a bread-holder, supporting links for said holder disposed on opposite ends thereof, said links being pivotally mounted on said frame, the opposite ends of said links being pivotally connected to said holder, the distance between the upper ends of said links being greater than the distance between the lower ends thereof, to effect a downwardly tilting movement of one end of the bread holder and an upwardly tilting movement of the other end thereof upon swinging movement of the bread holder.

2. In a toaster, a frame, opposed heating elements in said frame, a bread-holder disposed between said elements, supporting links for said holder, the upper ends of said links being pivotally supported by said frame and the lower ends thereof being pivotally secured to the lower edge of said holder, the distance between the upper ends of said links being greater than the distance between the lower ends thereof.

3. In a toaster, opposed housings, heating elements mounted therein, supporting links mounted on said housings, a bread-holder pivotally connected to the lower ends of said links, the distance between the upper ends of said links being greater than the distance between the lower ends thereof, and a handle secured to said holder above and to one side of the center of support thereof for tilting said holder laterally between said housings.

4. In a toaster, a bread holder including a bottom plate of channel-shape in lateral section having oppositely-extending recesses of L-shape in the flanges thereof, supporting members severally of U-shape having their intermediate portions located in the respective recesses to support the bread holder, and tongue portions struck out of the bottom plate to hold the supporting members in the recesses.

In testimony whereof, I have hereunto subscribed my name this 25th day of Aug. 1931.

FRANK F. FORSHEE.